US010080225B2

(12) United States Patent
Rittenhouse

(10) Patent No.: US 10,080,225 B2
(45) Date of Patent: Sep. 18, 2018

(54) FINDING MISSING WIRELESS NODES

(71) Applicant: Simmonds Precision Products, Inc., Vergennes, VT (US)

(72) Inventor: Garret Edward Rittenhouse, Burlington, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 93 days.

(21) Appl. No.: 15/176,410

(22) Filed: Jun. 8, 2016

(65) Prior Publication Data
US 2017/0359818 A1 Dec. 14, 2017

(51) Int. Cl.
H04W 72/04 (2009.01)
H04W 8/00 (2009.01)
H04W 8/22 (2009.01)

(52) U.S. Cl.
CPC ....... H04W 72/0446 (2013.01); H04W 8/005 (2013.01); H04W 8/22 (2013.01)

(58) Field of Classification Search
CPC .... H04W 72/0446; H04W 8/005; H04W 8/22
See application file for complete search history.

(56) References Cited

U.S. PATENT DOCUMENTS

| | | | |
|---|---|---|---|
| 6,360,076 B1 * | 3/2002 | Segura | H04L 1/0026 370/230 |
| 6,614,349 B1 | 9/2003 | Proctor et al. | |
| 8,539,102 B2 * | 9/2013 | Garcia | H04L 67/02 709/239 |
| 8,982,784 B2 | 3/2015 | Muller et al. | |
| 2002/0061031 A1 * | 5/2002 | Sugar | H04W 16/14 370/466 |
| 2006/0135145 A1 * | 6/2006 | Redi | H04W 52/0216 455/420 |
| 2006/0215583 A1 * | 9/2006 | Castagnoli | H04L 45/02 370/254 |

(Continued)

FOREIGN PATENT DOCUMENTS

WO WO 03026203 A2 * 3/2003 ............. H04L 45/02

OTHER PUBLICATIONS

Extended European Search Report dated Oct. 18, 2017, issued during the prosecution of European Patent Application No. EP 17173557.4 (7 pages).

*Primary Examiner* — Khaled Kassim
(74) *Attorney, Agent, or Firm* — Locke Lord LLP; Daniel J. Fiorello; Scott D. Wofsy

(57) ABSTRACT

A method for finding missing wireless nodes includes creating a repeating schedule of communication between a data concentrator and one or more nodes such that the data concentrator attempts to communicate with each of the one or more nodes at a discrete time slot for each node. The schedule of communication further includes at least one dead time slot such that the data concentrator does not attempt to communicate with any of the one or more nodes. The method also includes determining if each node has communicated with the data concentrator during a predetermined amount of discrete time slots, identifying each node that does not communicate with the data concentrator during the predetermined amount of discrete time slot as a missing node, and attempting to communicate with each missing node during the at least one dead time slot.

10 Claims, 2 Drawing Sheets

(56) References Cited

U.S. PATENT DOCUMENTS

| | | | |
|---|---|---|---|
| 2007/0268121 A1* | 11/2007 | Vasefi | G06Q 10/06 340/506 |
| 2008/0238614 A1* | 10/2008 | Delia | G06F 21/88 340/5.85 |
| 2008/0279155 A1* | 11/2008 | Pratt, Jr. | H04L 12/66 370/336 |
| 2009/0028119 A1* | 1/2009 | Avidor | H04W 72/1247 370/338 |
| 2010/0148931 A1* | 6/2010 | Pappu | G06K 7/0008 340/10.2 |
| 2011/0003610 A1 | 1/2011 | Key et al. | |
| 2013/0343202 A1* | 12/2013 | Huseth | H04W 52/0206 370/244 |
| 2015/0005977 A1 | 1/2015 | Francescon et al. | |
| 2015/0139198 A1* | 5/2015 | Hwang | H04W 52/0203 370/336 |
| 2016/0099863 A1 | 4/2016 | Messinger et al. | |
| 2016/0226575 A1* | 8/2016 | Subramani | H04W 72/1226 |

\* cited by examiner

FINDING MISSING WIRELESS NODES

BACKGROUND

1. Field

The present disclosure relates to finding wireless nodes, e.g., using remote data concentrators.

2. Description of Related Art

In order to ensure that a given network is robust, a remote data concentrator must be able to recover nodes that are intermittent, faulty, repaired, or replaced. This also assumes that the remote data concentrator has prior knowledge of how nodes should communicate.

In wireless networks, nodes are powered by battery or energy harvesting technologies. These power mechanisms are prone to failure or intermittency. In addition, nodes may lose communications due to changes in the wireless environment. To ensure that nodes can communicate with a remote data concentrator, the remote data concentrator must take into account that nodes in the network can sometimes no longer communicate, but must communicate with the remaining nodes. The remote data concentrator must take into account that the scheduling of operational nodes' communication schedule cannot be interrupted.

Such conventional methods and systems have generally been considered satisfactory for their intended purpose. However, there is still a need in the art for improved methods for finding wireless nodes that are missing. The present disclosure provides a solution for this need.

SUMMARY

A method for finding missing wireless nodes includes creating a repeating schedule of communication between a data concentrator and one or more nodes such that the data concentrator attempts to communicate with each of the one or more nodes at a discrete time slot for each node. The schedule of communication further includes at least one dead time slot such that the data concentrator does not attempt to communicate with any of the one or more nodes.

The method also includes determining if each node has communicated with the data concentrator during a predetermined amount of discrete time slots, identifying each node that does not communicate with the data concentrator during the predetermined amount of discrete time slot as a missing node, and attempting to communicate with each missing node during the at least one dead time slot.

The predetermined amount of discrete time slots can be one. In certain embodiments, the predetermined amount of discrete time slots is more than one. Any other suitable amount of discrete time slots that the node fails to communicate with the data concentrator in order to identify the node as missing is contemplated herein.

The method can include modifying the schedule to include dead time slots for each missing node. In certain embodiments, the dead time slots can be intermittently used to communicate with different missing nodes.

The at least one dead time slot can be at the end of the repeating schedule. In certain embodiments, the at least one dead time slot can be between discrete time slots for two or more of the nodes. Also, the at least one dead time slot can be the same length as one or more of the discrete time slots. Any suitable placement in the schedule and/or length for the dead time slots is contemplated herein.

In accordance with at least one aspect of this disclosure, a non-transitory computer readable medium includes computer executable instructions that cause a processor to perform a method for finding missing wireless nodes as described above.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain FIGURES, wherein.

DETAILED DESCRIPTION

Figure 1:
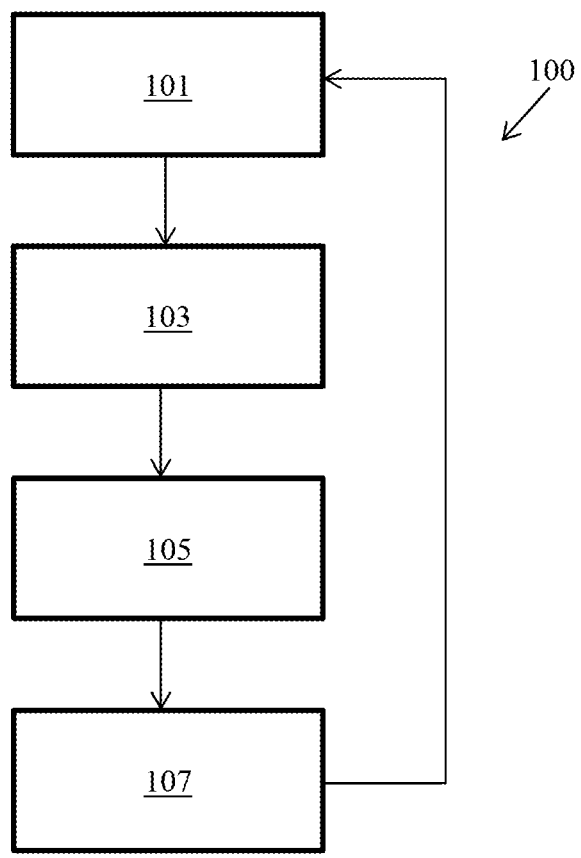
FIG. 1 is a flow diagram of a method in accordance with this disclosure.
Figure 2:
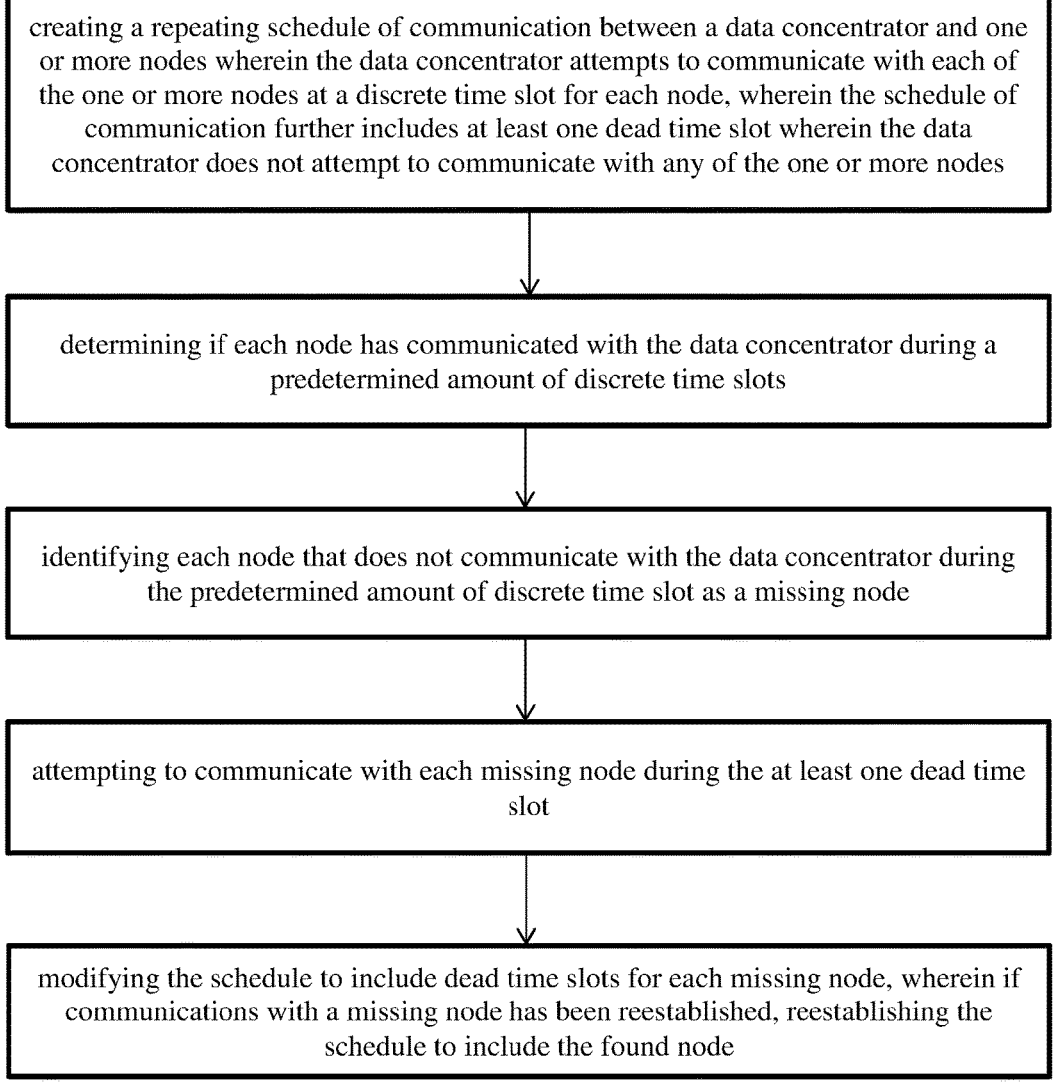
FIG. 2 shows an embodiment of a method in accordance with this disclosure.

Reference will now be made to the drawings wherein like reference numerals identify similar structural features or aspects of the subject disclosure. For purposes of explanation and illustration, and not limitation, an illustrative view of an embodiment of a method in accordance with the disclosure is shown in FIG. 1 and is designated generally by reference character 100. The systems and methods described herein can be used to identify missing nodes and account for the missing nodes to attempt to reestablish communication therewith.

Referring to FIG. 1, a method 100 for finding missing wireless nodes includes creating (e.g., at block 101) a repeating schedule of communication between a data concentrator (e.g., a wireless router) and one or more nodes (e.g., wireless sensors, computers, mobile devices, etc.) such that the data concentrator attempts to communicate with each of the one or more nodes at a discrete time slot for each node. The schedule of communication further includes at least one dead time slot such that the data concentrator does not attempt to communicate with any of the one or more nodes.

The method also includes determining (e.g., at block 103) if each node has communicated with the data concentrator during a predetermined amount of discrete time slots. The method includes identifying (e.g., at block 105) each node that does not communicate with the data concentrator during the predetermined amount of discrete time slot as a missing node.

The predetermined amount of discrete time slots can be one, for example. In certain embodiments, the predetermined amount of discrete time slots is more than one (e.g., three). Any other suitable amount of discrete time slots that the node fails to communicate with the data concentrator in order to identify the node as missing is contemplated herein.

The method further includes attempting to communicate (e.g., at block 107) with each missing node during the at least one dead time slot. In certain embodiments, the data concentrator can attempt to communicate with a node for a predetermined amount of dead time slots and then determine that the node is permanently disconnected. In certain embodiments, the data concentrator can wait one or more cycles of the schedule between attempts to reach out to a missing node again (e.g., one or more dead times can be skipped for a particular missing node).

The method can include modifying the schedule to include dead time slots for each missing node. In certain embodiments, the dead time slots can be intermittently used to communicate with different missing nodes (e.g., where multiple nodes are identified as missing and there is not enough time in a single dead time to communicate with all missing nodes).

The at least one dead time slot can be at the end of the repeating schedule. In certain embodiments, the at least one dead time slot can be between discrete time slots for two or more of the nodes. Also, the at least one dead time slot can be the same length as one or more of the discrete time slots or any other suitable length (e.g., long enough to allow communication with all scheduled nodes in the event all scheduled nodes went missing). Any suitable placement in the schedule and/or length for the dead time slots is contemplated herein.

As will be appreciated by those skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In accordance with at least one aspect of this disclosure, a non-transitory computer readable medium (e.g., a memory of a data concentrator and/or other connected hardware) includes computer executable instructions that cause a processor to perform a method for finding missing wireless nodes as described above. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

As described above, a remote data concentrator has prior knowledge of the schedule when wireless nodes should communicate and services the communications with a given node per the schedule. If a given node does not communicate within its scheduled time, it is marked as missing. Within a given schedule, there exist times when no operational node will communicate. During these times, the remote data concentrator has no communication duties and only tracks the nodes' schedules. Thus, the data concentrator uses the non-communicative time to actively hunt for missing nodes. During the non-communication time period, the remote data concentrator can actively send one or more queries to verify if one or more missing nodes exist. Once the non-communication time has elapsed and a scheduled communication must occur, the remote data concentrator services the scheduled communication. After servicing the communication, the remote data concentrator resumes searching for missing nodes until the next scheduled communication. By using the knowledge of the schedule for communications, the remote data concentrator can attempt to reestablish communications with any missing nodes, while not disrupting operational network communications. If during this reestablishment mode, communications with a missing node has been reestablished, the remote data concentrator can reconfigure the network to reestablish the schedule that includes the now found node. By this method, nodes that are intermittent and only communicate outside of the set schedule can be reinstated into the full operational schedule.

Embodiments solve the problem of recovering remote nodes in a network that consist of a remote data concentrator and multiple remote nodes. Embodiments also addresses that the nodes are running on a schedule as specified by the remote data concentrator. In order to ensure that a network is robust, a remote data concentrator must be able to function with missing nodes and be able to find nodes that communicate intermittently, have periodic power outages, or recover nodes when maintenance has been done on the network to bring back to full network functionality. If recovery of network resources is not done, a network is not robust and will not be able to function under adverse conditions.

The methods and systems of the present disclosure, as described above and shown in the drawings, provide for methods and systems for identifying and finding missing nodes. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A method for finding missing wireless nodes, comprising:
    creating a repeating schedule of communication between a data concentrator and one or more nodes wherein the data concentrator attempts to communicate with each of the one or more nodes at a discrete time slot for each node, wherein the schedule of communication further includes at least one dead time slot wherein the data concentrator does not attempt to communicate with any of the one or more nodes;
    determining if each node has communicated with the data concentrator during a predetermined amount of discrete time slots;
    identifying each node that does not communicate with the data concentrator during the predetermined amount of discrete time slot as a missing node;
    attempting to communicate with each missing node during the at least one dead time slot; and
    modifying the schedule to include dead time slots for each missing node, wherein if communications with a missing node has been reestablished, reestablishing the schedule to include the found node.

2. The method of claim 1, wherein the predetermined amount of discrete time slots is one.

3. The method of claim 1, wherein the predetermined amount of time slots is more than one.

4. The method of claim 1, wherein the at least one dead time slot is at the end of the repeating schedule.

5. The method of claim 1, wherein the at least one dead time slot is between discrete time slots for two or more of the nodes.

6. A non-transitory computer readable medium, comprising computer executable instructions that cause a processor to perform a method for finding missing wireless nodes, the method comprising:
    creating a repeating schedule of communication between a data concentrator and one or more nodes wherein the data concentrator attempts to communicate with each of the one or more nodes at a discrete time slot for each node, wherein the schedule of communication further includes at least one dead time slot wherein the data concentrator does not attempt to communicate with any of the one or more nodes;
    determining if each node has communicated with the data concentrator during a predetermined amount of discrete time slots;
    identifying each node that does not communicate with the data concentrator during the predetermined amount of discrete time slot as a missing node;
    attempting to communicate with each missing node during the at least one dead time slot; and
    modifying the schedule to include dead time slots for each missing node, wherein if communications with a missing node has been reestablished, reestablishing the schedule to include the found node.

7. The non-transitory computer readable medium of claim 6 wherein the predetermined amount of discrete time slots is one.

8. The non-transitory computer readable medium of claim 6 wherein the predetermined amount of time slots is more than one.

9. The non-transitory computer readable medium of claim 6, wherein the at least one dead time slot is at the end of the repeating schedule.

10. The non-transitory computer readable medium of claim 6, wherein the at least one dead time slot is between discrete time slots for two or more of the nodes.

* * * * *